(12) United States Patent
Brunson et al.

(10) Patent No.: US 10,182,213 B2
(45) Date of Patent: Jan. 15, 2019

(54) SECURITY CAMERA PRIVACY SHUTTER

(71) Applicant: Vivint, Inc., Provo, UT (US)

(72) Inventors: Nic Brunson, Salt Lake City, UT (US); Wade Shearer, Lehi, UT (US); Michael Warner, Payson, UT (US); Stefan Walger, Salt Lake City, UT (US); Michael David Child, Lehi, UT (US)

(73) Assignee: Vivint, Inc., Provo, UT (US)

( * ) Notice: Subject to any disclaimer, the term of this patent is extended or adjusted under 35 U.S.C. 154(b) by 879 days.

(21) Appl. No.: 14/293,924

(22) Filed: Jun. 2, 2014

(65) Prior Publication Data

US 2015/0350612 A1 Dec. 3, 2015

(51) Int. Cl.
*G08B 13/196* (2006.01)
*H04N 7/18* (2006.01)
*H04N 5/225* (2006.01)

(52) U.S. Cl.
CPC ....... *H04N 7/183* (2013.01); *G08B 13/19617* (2013.01); *G08B 13/19619* (2013.01); *H04N 5/2251* (2013.01)

(58) Field of Classification Search
None
See application file for complete search history.

(56) References Cited

U.S. PATENT DOCUMENTS

| | | | |
|---|---|---|---|
| 3,672,269 A | 6/1972 | Tabankin | |
| 5,155,474 A | 10/1992 | Park et al. | |
| 5,949,474 A * | 9/1999 | Gerszberg | H04N 7/141 348/14.01 |
| 7,548,255 B2 | 6/2009 | Bear et al. | |
| 7,874,744 B2 * | 1/2011 | Cirker | G08B 13/19634 396/427 |
| 8,123,419 B2 | 2/2012 | Cirker | |
| 8,137,009 B2 | 3/2012 | Cirker | |
| 8,350,915 B2 | 1/2013 | Schnell | |
| 8,632,264 B2 | 1/2014 | Schmit et al. | |
| 8,902,318 B1 * | 12/2014 | Haddad | H04N 5/23245 348/207.1 |
| 8,988,532 B2 * | 3/2015 | Soffer | G03B 11/043 348/207.1 |
| 9,317,721 B2 * | 4/2016 | Plagemann | G06F 21/82 |
| 2003/0165337 A1 * | 9/2003 | Inazuka | G03B 17/00 396/448 |
| 2006/0092011 A1 * | 5/2006 | Simon | G08B 13/19682 340/521 |
| 2009/0160673 A1 | 6/2009 | Cirker | |
| 2010/0238262 A1 * | 9/2010 | Kurtz | H04N 7/142 348/14.01 |
| 2012/0148227 A1 * | 6/2012 | Schmit | G03B 11/043 396/448 |

(Continued)

*Primary Examiner* — William C Vaughn, Jr.
*Assistant Examiner* — Lindsay J Uhl
(74) *Attorney, Agent, or Firm* — Holland & Hart, LLP

(57) ABSTRACT

A method for improving privacy of security cameras is described. In one embodiment, predetermined events are monitored via a security camera. The security camera may include an optical barrier. At least one of the predetermined events is detected via the security camera. Based on detecting at least one of the predetermined events, the optical barrier is repositioned, via the security camera, in relation to a camera lens of the security camera.

18 Claims, 7 Drawing Sheets

(56) References Cited

U.S. PATENT DOCUMENTS

2015/0093102 A1\* 4/2015 Oguchi ............... G03B 11/043
396/435
2015/0130614 A1\* 5/2015 Liu .................... G08B 13/2494
340/541

\* cited by examiner

SECURITY CAMERA PRIVACY SHUTTER

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of premises automation and security products. These products include internal security cameras. An occupant of a home or office may install a security camera within an area of a home or office and record images of the area via the security camera. An occupant may not know, however, when the security camera is active and capturing images. As a result, benefits may be realized by providing systems and methods for security camera privacy.

SUMMARY

According to at least one embodiment, a method for improving privacy of security cameras is described. In one embodiment, predetermined events may be monitored via a security camera. The security camera may include an optical barrier. At least one of the predetermined events may be detected via the security camera. Based on detecting at least one of the predetermined events, the optical barrier may be repositioned, via the security camera, in relation to a camera lens of the security camera.

In one embodiment, upon detecting at least one of the predetermined events, the optical barrier may be repositioned to obstruct a field of view of the security camera. In some cases, the optical barrier may be configured to be visible within a predetermined distance from the security camera when the optical barrier is obstructing the security camera's field of view. The method may include activating a first visual indicator upon repositioning the optical barrier to obstruct the security camera's field of view. In one configuration, the first visual indicator may be located on the optical barrier.

In one embodiment, the method may include deactivating the first visual indicator upon repositioning the optical barrier to uncover the cameras lens. In some embodiments, a second visual indicator may be activated upon repositioning the optical barrier to uncover the cameras lens. In some cases, the method may include generating a notification upon repositioning the optical barrier.

In one embodiment, detecting the predetermined events may include receiving a remote request to activate the camera, verifying an identity associated with the remote request, and upon verifying the identity, implementing a notification and activating the camera. In some cases, detecting the predetermined events may include detecting a voice command from an occupant of a premises where the security camera is located. In one embodiment, detecting the predetermined events may include detecting initiation of communications between an occupant of a premises where the security camera is located and an administrator associated with the security camera.

A computing device configured for security camera privacy is also described. The device may include a processor and memory in electronic communication with the processor. The memory may store instructions that may be executable by the processor to monitor for predetermined events, the security camera comprising an optical barrier, detect at least one of the predetermined events, and based on detecting at least one of the predetermined events, reposition the optical barrier in relation to a camera lens of the security camera.

A computer-program product for security camera privacy is also described. The computer-program product may include a non-transitory computer-readable medium that stores instructions. The instructions may be executable by the processor to monitor for predetermined events, the security camera comprising an optical barrier, detect at least one of the predetermined events, and based on detecting at least one of the predetermined events, reposition the optical barrier in relation to a camera lens of the security camera.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
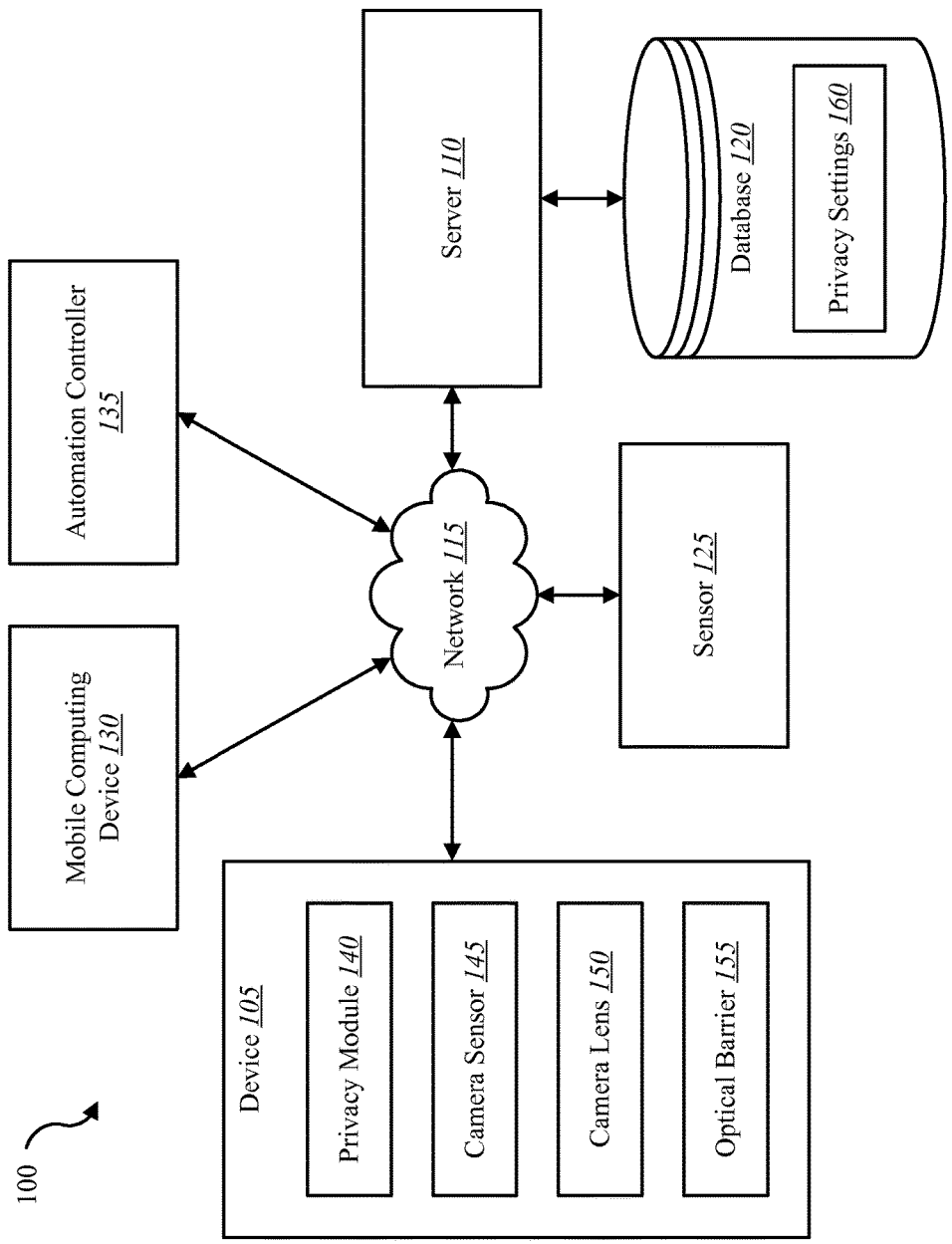
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed.

Rather, the instant disclosure covers all modifications, equivalents, and alternatives falling within the scope of the appended claims.

DETAILED DESCRIPTION OF EXEMPLARY EMBODIMENTS

The following relates generally to improving the privacy of home security cameras. The typical home security camera includes a camera sensor and camera lens housed within a camera body, which may include a stand and/or mounting hardware. Such a home security camera may be configured to record only upon detecting motion. If the camera is not detecting motion, then the camera may be inactive. Nevertheless, the camera sensor and camera lens of the typical security camera remain visible at all times. This visibility may be a cause of apprehension for certain occupants of a home or office. Some occupants may feel uncomfortable never really knowing whether the internal security camera is active and capturing images or in an inactive state. Accordingly, to address such concerns, the systems and methods described herein improve the assurance of privacy in relation to internal security cameras.

Currently, the camera lens of a security camera is exposed whether the security camera is recording. In some cases, a security camera may activate a recording indicator (e.g., a light) to indicate that the camera is currently recording. In some cases, a hacker may gain control of the security camera. The hacker may configure the camera to record without activating the light. Thus, an occupant may be recorded without any indication they are being recorded. Some security cameras may not include any indicators that the camera is active and recording. Moreover, in some cases, the occupant may want the security camera with indicators to record without providing any indication that images are being captured. For example, parents may want a security camera to capture images of a babysitter watching their child without the security camera giving any indication that recording is occurring. The same parents, however, may not want the security camera to record while they are at home such as when they are watching a movie in a family room, etc. Thus, occupants of the home may feel apprehension with the camera facing them (e.g., while watching a movie at home, etc.), never really knowing whether the camera is presently capturing images.

Accordingly, one aspect of the invention relates to systems, methods and related devices for improving the privacy of home security cameras. In one embodiment, predetermined events may be monitored in relation to a security camera. The security camera may include an optical barrier. The optical barrier may be configured to block the security camera from capturing an image of an area that the security camera is positioned to view. For example, the security camera may be mounted on one end of an office area or in the corner of a great room of a house where the great room includes a kitchen area and an adjoining family room area. Taking the great room example, when the optical barrier is covering the lens of the camera, the camera sensor may be at least partially blocked from capturing an image of the great room. In some embodiments, if the camera sensor were to capture an image with the optical barrier positioned to obstruct the camera lens, the camera sensor may be able to detect only the interior side of the optical barrier that faces the camera lens. In any case, at least a portion of the field of view of the security camera is obstructed via the optical barrier being positioned to cover at least a portion of the camera lens. Even in those cases where the security camera may be positioned remotely, if the optical barrier is positioned to obstruct the camera sensor, the security camera's field of view remains obstructed even when the security camera's position is adjusted.

In some embodiments, the optical barrier may be configured to be visible to a human within a predetermined distance from the security camera when the optical barrier is blocking the camera lens from view. Taking the great room example again, with the security camera mounted at one end of the great room, such as in a corner of the family room, the optical barrier may be configured to be viewed by an occupant even when the occupant is at the opposite end of the great room, such as in the kitchen area. Benefits may be realized by the abovementioned systems and methods. These benefits include providing an assurance of privacy related to indoor security cameras while maintaining a level of security at least equivalent to existing security cameras.

FIG. 1 is a block diagram illustrating one embodiment of an environment 100 in which the present systems and methods may be implemented. In some embodiments, the systems and methods described herein may be performed on a device (e.g., device 105). The environment 100 may include device 105, a server 110, a sensor 125, a mobile computing device 130, an automation controller 135, and a network 115 that allows the device 105, the server 110, the mobile computing device 130, automation controller 135, and sensor 125 to communicate with one another.

Examples of the device 105 may include a security camera (e.g., an internal security camera), a mobile computing device, a smart phone, a personal computing device, a computer, server, etc. Examples of the server 110 may include an application server, a network server, a catalog server, a communications server, a database server, a file server, a home server, a mail server, a name server, a proxy server, a web server, a virtual server, a server administered by a premises automation and/or security company, and the like. Accordingly, in some embodiments, environment 100 includes connections to two or more servers (e.g., a connection to database server and a connection to a premises security company server, etc.). Examples of the automation controller 135 may include a dedicated premises automation computing device (e.g., wall-mounted controller), a personal computing device (e.g., laptop, desktop, etc.), a mobile computing device (e.g., tablet computing device, smart phone, etc.), and the like.

Examples of sensor 125 include a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, other types of sensors, actuators, or combinations thereof. Sensor 125 may represent one or more separate sensors or a combination of two or more sensors in a single device. For example, sensor 125 may represent one or more camera sensors and one or more motion sensors connected to environment 100. Sensor 125 may be integrated with a facial recognition system. Although sensor 125 is depicted as connecting to device 105 over network 115, in some embodiments, sensor 125 may connect directly to or within device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be carried by an occupant. Sensor 125 may include a wireless communication sensor 125 configured to send and receive data and/or information to and from one or more devices in environment 100. Additionally, or alternatively, sensor 125 may include a GPS sensor to enable sensor 125 to track a location of sensor 125 attached to an occupant and/or a device. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a privacy module 140, a camera sensor 145, a camera lens 150, and an optical barrier 155. Although the components of the device 105 are depicted as being internal to the device 105, it is understood that one or more of the components may be external to the device 105 and connect to device 105 through wired and/or wireless connections. In some embodiments, an application may be installed on mobile computing device 130, the application enabling a user to interface with a function of device 105, privacy module 140, automation controller 135, and/or server 110.

In some embodiments, device 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a privacy module 140. For example, device 105 may include logic and/or executable instructions that enables device 105 to interface with automation controller 135, mobile computing device 130, and/or server 110. In some embodiments, device 105, mobile computing device 130, automation controller 135, and server 110 may include a privacy module 140 where at least a portion of the functions of privacy module 140 are performed separately and/or concurrently on device 105, mobile computing device 130, automation controller 135, and/or server 110. Likewise, in some embodiments, a user may access the functions of device 105 and/or automation controller 135 (directly or through device 105 via privacy module 140) from mobile computing device 130. For example, in some embodiments, mobile computing device 130 includes a mobile application that interfaces with one or more functions of device 105, automation controller 135, privacy module 140, and/or server 110.

In some embodiments, server 110 may be coupled to database 120. Database 120 may include privacy settings 160. For example, device 105 may access privacy settings 160 in database 120 over network 115 via server 110. Database 120 may be internal or external to the server 110. In one example, device 105 may be coupled directly to database 120, database 120 being internal or external to device 105. Thus, although database 120 is depicted as being connected to server 110, embodiments include the database 120 being connected to connected or being within device 105, mobile computing device 130, and/or automation controller 135.

In one embodiment, device 105 may include one or more communication devices. Device 105 may communicate with one or more computing devices and/or an automation/security control panel, through wired and/or wireless communication means. For instance, device 105 may implement communications based on Z-Wave, Zigbee, BLUETOOTH® low energy, near-field communication (NFC), universal serial bus (USB) wireless, 345 MHz wireless, an IEEE 802 wireless standard, etc. In some cases, the device 105 may use a low-powered wireless protocol (BLUETOOTH® low energy, Z-Wave, Zigbee, NFC, 345 MHz, etc.) to communicate with one or more devices. In some cases, the device 105 may recognize the identity of one or more devices. For example, the device 105 may recognize an occupant based on an identifier communicated by a smart phone carried by the occupant or based on a smart collar worn by a pet, and so forth.

In some embodiments, privacy module 140 may reposition optical barrier 155 based on one or more events. For example, device 105 may detect the presence of devices associated with known occupants of a home. In some cases, upon detecting the presence of an unknown occupant, privacy module 140 may reposition the optical barrier 155 to unblock the view of camera lens 150 and activate the camera sensor 145 to capture one or more images (e.g., photographic and/or video images). The device 105 may be configured to detect unknown occupants by detecting the presence of a human and/or pet within the home and determining whether the human and/or pet is associated with a known device via low-powered wireless communication. Upon determining the human and/or pet are not associated with a known device (e.g., not carrying a device that emits an identifier recognized by device 105), the privacy module 140 may configure device 105 to capture one or more images of the unknown occupant. Further details regarding the privacy module 140 are discussed below.

Figure 2:
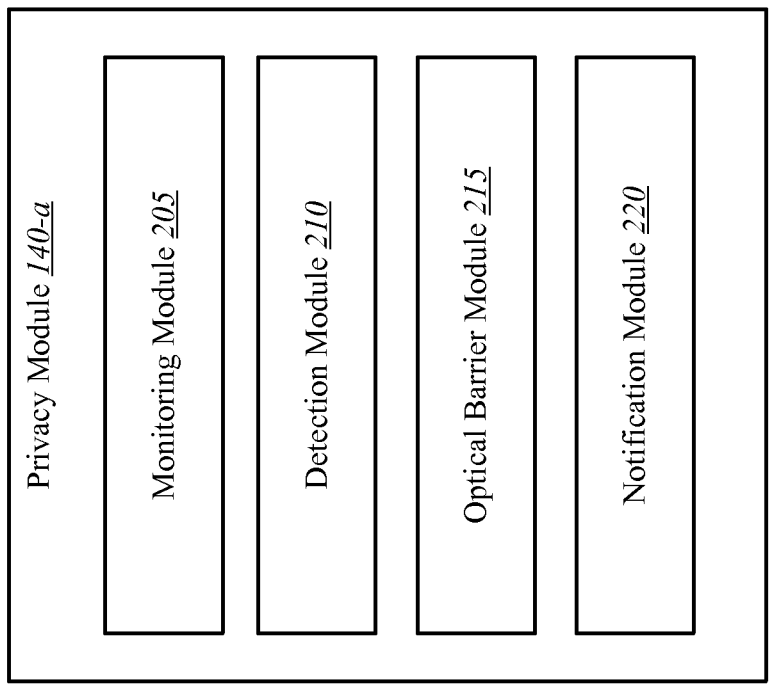
FIG. 2 is a block diagram illustrating one example of a privacy module.

FIG. 2 is a block diagram illustrating one example of a privacy module 140-*a*. Privacy module 140-*a* may be one example of privacy module 140 depicted in FIG. 1. As depicted, privacy module 140-*a* may include monitoring module 205, detection module 210, optical barrier module 215, and notification module 220.

In one embodiment, privacy module 140-*a* may be configured to protect the privacy of occupants of a premises in relation to a security camera located in the premises. As described above, the security camera may include an optical barrier (e.g., optical barrier 155 of FIG. 1). In one embodiment, monitoring module 205 may monitor for predetermined events. In some cases, detection module 210 may detect at least one of the predetermined events. In some embodiments, the monitoring module 205 and/or detection module 210 may operate in conjunction with one or more sensors (e.g., sensor 125). The one or more sensors may be configured to monitor and/or detect one or more of the predetermined events.

Based on detecting at least one of the predetermined events, the optical barrier module 215 may reposition the optical barrier in relation to a camera lens of the security camera. The optical barrier may include one or more objects configured to obstruct and/or scatter light. In one example, the optical barrier may include an opaque material that obstructs the transmission of light. Additionally, or alternatively, the optical barrier may include an obscuring material that scatters and/or distorts the transmission of light. In one configuration, the optical barrier module 215 may position the optical barrier to uncover the camera lens, allowing light to reach the camera lens unobstructed, and thus permitting light captured by the camera lens to reach a camera sensor of the security camera. In another configuration, the optical barrier module 215 may position the optical barrier to cover the camera lens, thus obstructing light from reaching the camera lens. Accordingly, upon detecting at least one of the predetermined events via the detection module 210, optical barrier module 215 may reposition the optical barrier to obstruct the transmission of light in relation to the cameras lens. In some cases, detection module 210 may detect an event triggering optical barrier module 215 to uncover the camera lens. For example, upon detecting motion that triggers an alarm, optical barrier module 215 may position the optical barrier to uncover the camera lens. In some cases, the optical barrier module 215 may determine the position of the optical barrier. The optical barrier module 215 may reposition the optical barrier to automatically uncover the camera lens when a security system is activated, such as when the security system is set to "away" (e.g., the premises is unoccupied) or when the security system is set to "sleep" (e.g., occupants retire to bed for the evening).

In one embodiment, the optical barrier may include one or more opaque and/or light-obscuring physical objects. For example, the optical barrier may include one or more non-transparent objects. Additionally, or alternatively, the optical barrier may include one or more objects configured to diffuse or scatter light. Accordingly, light that would have entered the camera lens unimpeded would be scattered and diffused with the optical barrier positioned to obstruct the camera lens. In one configuration, the optical barrier may connect to one or more motors. Thus, the positioning of the optical barrier by the optical barrier module 215 may be automated upon the detection module 210 detecting one or more events. In one embodiment, the one or more events may be detected by the detection module 210 at the security camera. Additionally, or alternatively, the one or more events may detected by the detection module 210 at a control panel that is communicatively connected to the security camera. Based on the detection of one or more events, the optical barrier module 215, without human intervention, may reposition the optical barrier in relation to a camera lens of the security camera. Thus, in conjunction with privacy module 140-a, the security camera may be enabled to position the optical barrier to obstruct the camera lens upon detecting certain events, and the security camera may be enabled to position the optical barrier to uncover the camera lens upon detecting certain events.

Examples of detectable events include triggering of a time of day setting, a triggering of a day of the week setting, detecting a sleep mode, detecting an away mode, detecting activation of a security system, detecting a triggering of the active security system such as detecting a potential intruder, detecting a pet, detecting a command initiated from an authorized user, and the like. A command from an authorized user may include a voice command from a user located within a predetermined range of the security camera. Thus, in some cases, detection module 210 may detect a voice command from an occupant of a premises where the security camera is located. For example, the detection module 210 may detect the occupant giving a voice command to cover the camera lens with the optical barrier. Additionally, or alternatively, the detection module 210 may detect a command from the authorized user that is sent remotely. For example, an authorized user may send, via a mobile computing device (e.g., mobile computing device 130), a request to capture one or more images while the optical barrier is covering the camera lens. Upon authorizing the user, the optical barrier may be moved to uncover the camera lens, one or more images may be captured based on a remote command sent by the authorized user, and the one or more captured images may be stored in a storage device and/or sent to a destination provided by the authorized user (e.g., an email address, etc.). In some cases, the authorized user may receive a live view captured by the security camera. In such cases, notification may be provided at the premises where the security camera is located such as an audible tone generated by the notification module 220, alerting occupants of the premises that the optical barrier is being repositioned to uncover the camera lens.

In one embodiment, the optical barrier may be configured to be visible within a predetermined distance from the security camera when the optical barrier is obstructing the security camera's field of view. The outward, visible side of the optical barrier may configured to include a color that makes the optical barrier relatively easy to view from a predetermined distance. The outward, visible side of the optical barrier may include any combination of colors and/or patterns to make the optical barrier relatively more visible from a predetermined distance. In some cases, the security camera may activate a first visual indicator upon repositioning the optical barrier to obstruct the cameras lens from view. In one configuration, the security camera may deactivate the first visual indicator upon repositioning the optical barrier to uncover the cameras lens. In some cases, the security camera may activate a second visual indicator upon repositioning the optical barrier to uncover the cameras lens. In one embodiment, the outward, visible side of the optical barrier may include one or more lights (e.g., light-emitting diodes (LEDs), etc.). In one embodiment, the notification module 220 may configure the lights to emit light when the optical barrier is positioned to obstruct the camera lens. In some cases, the notification module 220 may configure the lights to stop emitting light when the optical barrier is positioned to uncover the camera lens.

In some embodiments, notification module 220 may activate a first visual indicator upon repositioning the optical barrier to obstruct the security camera's field of view. In some configurations, the first visual indicator may be located on the outward, visible side of the optical barrier. For example, one or more LEDs may be attached to the optical barrier such that the LEDs are visible when the optical barrier is positioned to obstruct the security camera from capturing images by covering the camera lens. With the optical barrier covering the camera lens, the LEDs may be activated. The LEDs may be activated for a predetermined time period. In some cases, the LEDs may be on the entire time the optical barrier covers the camera lens. In one embodiment, the LEDs may be flash for a certain time after the optical barrier is repositioned to cover the camera lens and then stop flashing and turn off while the optical barrier remains covering the camera lens. In some cases, the LEDs may flash in a preset pattern. As one example, the LEDs may flash every five seconds while the optical barrier is in a position that obstructs the camera lens from admitting light to the camera sensor. In some embodiments, a second visual indicator may be triggered upon repositioning the optical barrier to uncover the cameras lens. For example, one or more other LEDs may flash for a predetermined time period while the optical barrier uncovers the camera lens and/or after the camera lens is uncovered. In some cases, one or more LEDs may turn on when the security camera is capturing one or more images (e.g., photographic images and/or video images). Accordingly, the visibility of the optical barrier may be increased via one or more lights operating in conjunction with the optical barrier. Thus, an occupant may instantly determine whether the camera is capable of capturing an image by simply looking in the direction of the security camera, visually determining whether the optical barrier is in place (e.g., obstructing the camera lens) or whether the optical barrier is not in place (e.g., the camera lens is not being obstructed). In some embodiments, notification module 220 may generate a notification upon detecting the optical barrier being repositioned to cover and/or to uncover the cameras lens.

In one embodiment, notification module 220 may deactivate the first visual indicator upon repositioning the optical barrier to uncover the cameras lens. Notification module 220 may activate a second visual indicator upon repositioning the optical barrier to uncover the cameras lens. In some cases, notification module 220 may generate a textual notification upon repositioning the optical barrier. For example, notification module 220 may generate an email, a text message, a social media message (e.g., FACEBOOK® private message, etc.), upon detecting the optical barrier being repositioned. In some cases, notification module 220 may generate an audible alert. For example, the notification module 220 may generate a tone or chime that is uniquely associated with the positioning of the optical barrier such that an occupant hearing this tone may recognize it being associated with an operation of the positioning of the optical barrier. For example, a first tone may indicate the optical barrier covering the camera lens, and a second tone may indicate the optical barrier uncovering the camera lens. In some cases, the notification module 220 may provide a text-to-voice alert indicating a positioning of the optical barrier (e.g., "the camera lens is being obstructed," etc.).

In one embodiment, the detection module 210 may receive a remote request to activate the camera and verify an identity associated with the remote request. In some cases, upon verifying the identity, notification module 220 may implement a notification. Thus, the privacy module 140-a may allow the security camera to be activated remotely such that the security camera is able to capture one or more images (e.g., photographic and/or video images). In some embodiments, an occupant may configure the notification module 220 to not provide notification regarding the remote operation of the security camera. For example, parents of children being babysat may want to capture one or more images without providing any indication to the babysitter that images are being captured.

In some embodiments, detection module 210 may detect initiation of communications between an occupant of a premises where the security camera is located and an administrator associated with the security camera. For example, the security camera may be associated with a security system and/or automation system. The security/automation system may be configured to be monitored by a security monitoring company. Thus, as one example, the security camera may be located in a home with a security/automation system monitored by VIVINT®. Thus, when the detection module 210 detects initiation of communications between an occupant of the home and a VIVINT® representative, detection module 210 may determine whether the optical barrier is positioned to obstruct the camera lens. In some configurations, upon detecting initiation of the indicated communications and that, the detection module 210 may instruct the optical barrier module 215 to position the optical barrier to uncover the camera lens according to user settings. Accordingly, the occupant of the home may communicate with the VIVINT® representative via a phone and/or a speaker/microphone associated with the security/automation system. Additionally, with the camera lens uncovered, the VIVINT® representative may be authorized to receive a live view captured by the security camera, which may include the occupant in the field of view of the security camera. In some cases the security company may visually confirm the identity of an occupant by requesting the occupant stand within the field of view of the security camera.

Figure 3:
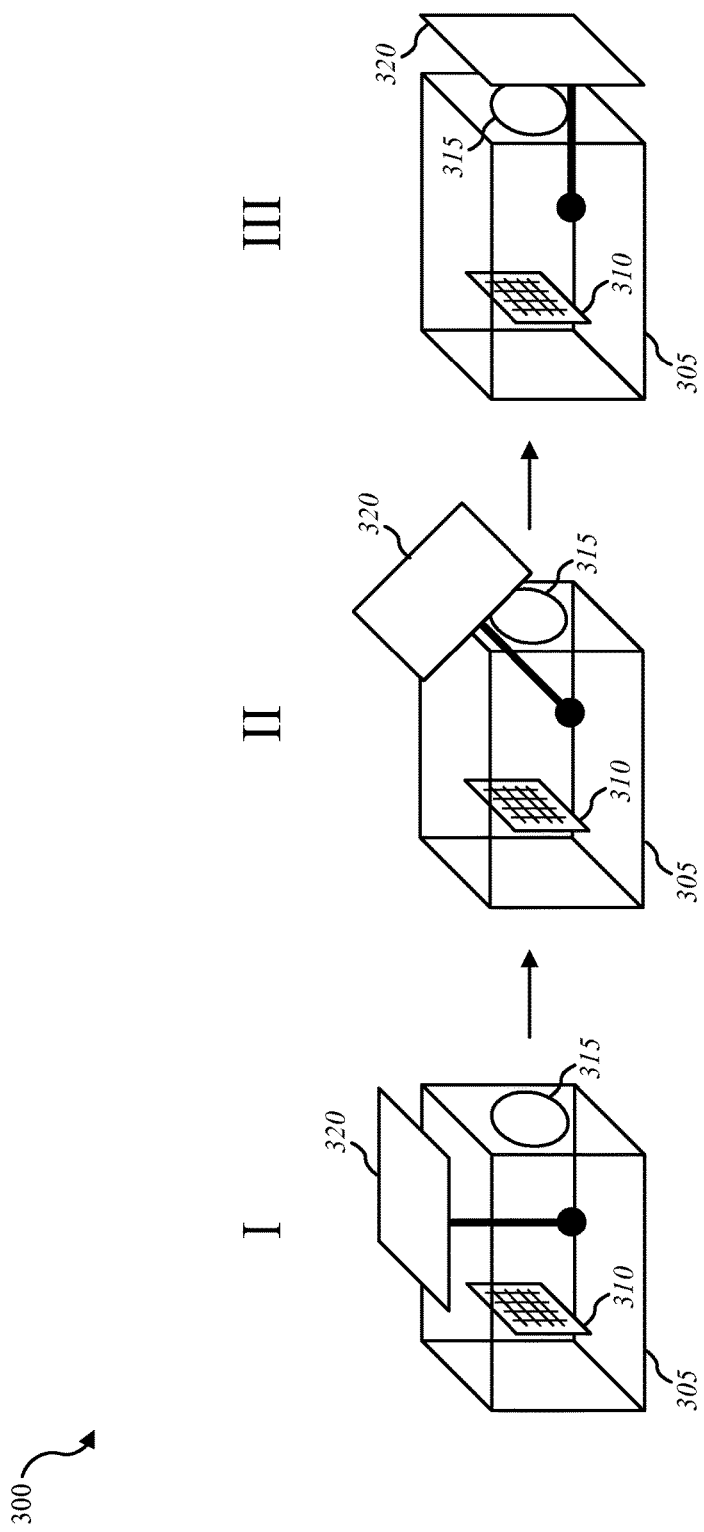
FIG. 3 is a block diagram illustrating an environment depicting a one example of side-view of a security camera in which the present systems and methods may be implemented.

FIG. 3 is a block diagram illustrating an environment 300 depicting a one example of side-view of a security camera 305 in which the present systems and methods may be implemented. Security camera 305 may be one example of device 105 from FIG. 1. As depicted, security camera 305 may include a security sensor 310, a camera lens 315, and an optical barrier 320.

Although the body of the security camera 305 is depicted with a certain shape (e.g., rectangular), it is understood that embodiments of the body of security camera 305 include a variety of shapes and configurations. As illustrated, the optical barrier 320 may include a single opaque object that may block light from entering the security camera 305. As depicted, the optical barrier 320 may be attached to a lever arm and a motor assembly coupled to the security camera 320. In some embodiments, the optical barrier 320 may include one or more opaque and/or light-diffusing objects that are configured to obstruct light from entering the body of security camera 305. Optical barrier 320 may be configured to be visibly noticeable within a predetermined distance of security camera 305. Although the optical barrier 320 is depicted as being attached to a lever on an outer surface of security camera 305, embodiments of optical barrier 320 and the security camera 305 include any variety of internal and external connections between the optical barrier 320 and security camera 305. For example, optical barrier 320 may include an object relatively the same size as lens 315 that sits parallel to lens 315. For example, optical barrier 320 may be a round object that sits out of the way of lens 315 in a plane that is parallel to the plane of the front of security camera 305. In this embodiment, optical barrier 320 may be may be spring loaded and configured to pivot on an attachment point. Actuating a lever may release the spring, allowing optical barrier to pivot into a position that obstructs lens 315. In some cases, the optical barrier 320 may include an opaque object that slides from side to side or top to bottom in order to cover and uncover the camera lens 315.

Although the optical barrier 320 is depicted as being one piece, it is understood that the optical barrier 320 may include two or more pieces that may be moved to cover the lens and block the camera view. For example, the optical barrier may include multiple spring-loaded opaque objects that may spring into a position that together form an optical barrier. Thus, in some cases, optical barrier 320 may include multiple objects that are spring loaded, that when released, slide into place such that camera lens 315 is obstructed. Accordingly, optical barrier 320 may be configured to obstruct camera sensor 310 from capturing images of one or more rooms the camera 305 is situated to otherwise view, obstructing the field of view of camera sensor 310.

In some cases, the camera lens 315 itself may pivot. For example, the camera lens 315 may include optics that, when aligned with the camera sensor 310, focuses light onto the camera sensor 310, enabling the camera sensor 310 to capture images within the field of view of the sensor 310. The camera lens 315 may be configured as a barrel-like, cylindrical object. The optics of the camera lens may be contained within the barrel-like object. The cylindrical walls of the barrel camera lens may be opaque, allowing no light to escape out of the sides of the barrel camera lens, but allowing light only to enter and escape from the back and front of the barrel camera lens. Thus, the front of the barrel camera lens may include a lens that captures light and transmits the captured light through the barrel camera lens, and the back of the barrel camera lens may include a lens to focus the captured light onto the camera sensor. In some cases, the front and back lens may be the same lens. In some embodiments, the barrel camera lens may include a front lens, a back lens in addition to the front lens, and one or more interior lenses in addition to the front and back lenses. The outer cylindrical sidewalls of the surface of the barrel camera lens may include one or more pivot points. The one or more pivot points may enable the security camera to automatically pivot the barrel camera lens to align the optics with the camera sensor 310, as well as to pivot the barrel camera lens so that the optics do not align with the camera sensor 310, but instead, the opaque sidewalls of the barrel camera lens align with the camera sensor 310. Thus, the opaque sidewalls of the barrel camera lens may be the optical barrier that obstructs light from the camera sensor 310.

Environment 300 depicts three phases in relation to the positioning of optical barrier 320. Phase I depicts the optical barrier 320 in a withdrawn state. With the optical barrier 320 in the withdrawn state, the camera lens 315 is left unobstructed, allowing the camera sensor 310 to capture images based on the field of view of the camera 305. Phase II depicts the optical barrier 320 in a transitional state. In one embodiment, phase II depicts the optical barrier 320 being repositioned from the withdrawn state of phase I to a position in which the optical barrier 320 is obstructed. In one embodiment, phase II depicts the optical barrier 320 being repositioned from the position in which the optical barrier 320 is obstructed to the withdrawn state of phase I. Phase III depicts the optical barrier positioned in an obstructing state. With the optical barrier 320 in the obstructing state, operation of the camera lens 315 is impeded, the optical barrier 320 obstructing the camera sensor 310 from capturing meaningful images. Moreover, with the optical barrier 320 positioned in the obstructing state, an occupant of the premises where the security camera 305 is located may be enabled to visually determine with a mere glance that the security camera 305 is obstructed from capturing images.

Figure 4:
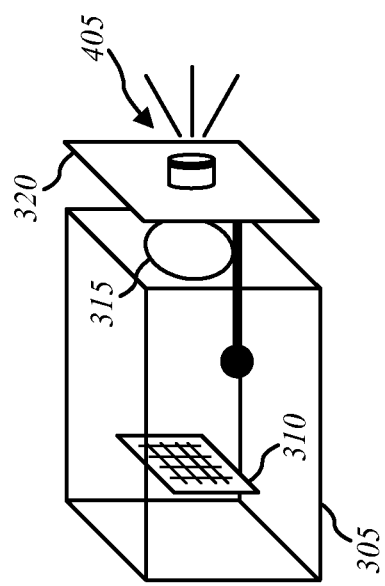
FIG. 4 is a block diagram illustrating another example of side-view of a security camera in which the present systems and methods may be implemented.

FIG. 4 is a block diagram illustrating another example of environment 400 depicting a side-view of a security camera 305 in which the present systems and methods may be implemented. Environment 400 depicts camera 305 with an optical barrier 320 in the obstructing state, similar to phase III of FIG. 3. As illustrated, the optical barrier 320 may include a visual indicator 405. The visual indicator 405 may include a color, a pattern, light, or any combination of colors, patterns, and lights. In some embodiments, the visual indicator 405 may include one or more LEDs configured to emit light when the optical barrier 320 is positioned in the obstructing state.

Figure 5:
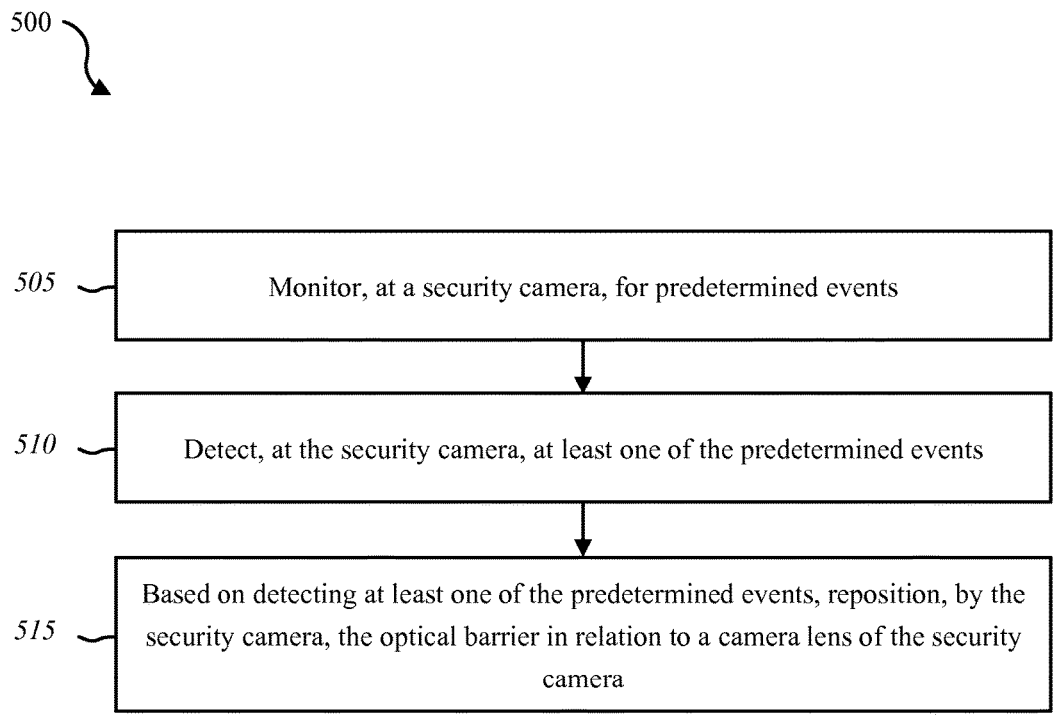
FIG. 5 is a flow diagram illustrating one embodiment of a method for security camera privacy.

FIG. 5 is a flow diagram illustrating one embodiment of a method 500 for security camera privacy. In some configurations, the method 500 may be implemented by the privacy module 140 illustrated in FIG. 1 or 2. In some configurations, the method 500 may be implemented in conjunction with an application and/or the user interface associated with one or more devices depicted in FIG. 1.

At block 505, a security camera may monitor for predetermined events. The security camera may include an optical barrier. At block 510, at least one of the predetermined events may be detected at the security camera. At block 515, based on detecting at least one of the predetermined events, the optical barrier may be repositioned by the security camera in relation to a camera lens of the security camera.

Figure 6:
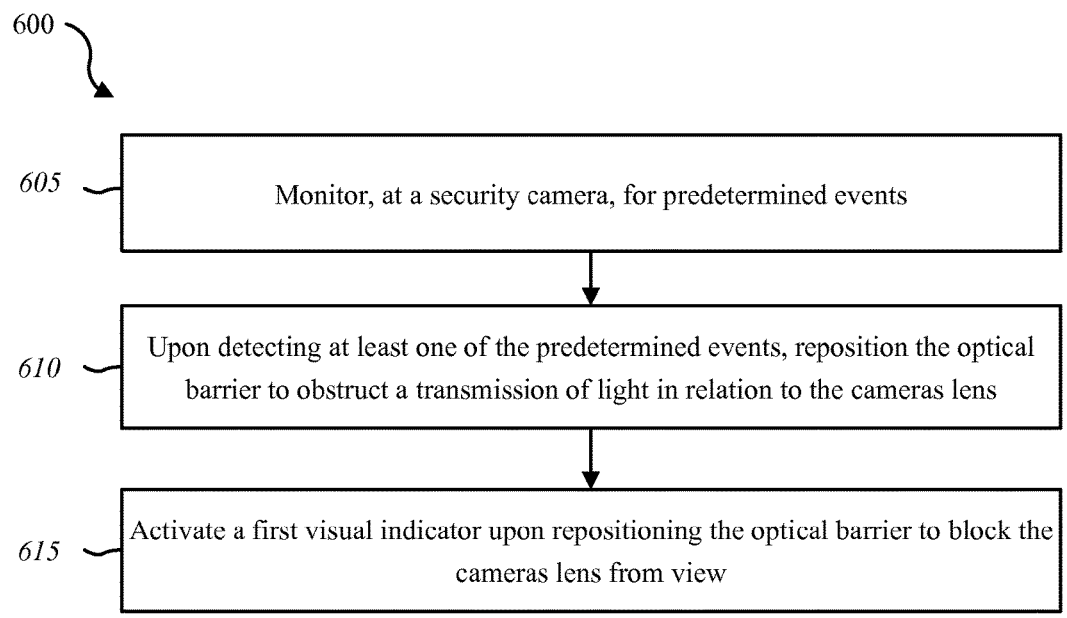
FIG. 6 is a flow diagram illustrating one embodiment of a method for improving privacy associated with a security camera.

FIG. 6 is a flow diagram illustrating one embodiment of a method 600 for improving privacy associated with a security camera. In some configurations, the method 600 may be implemented by the privacy module 140 illustrated in FIG. 1 or 2. In some configurations, the method 600 may be implemented in conjunction with an application and/or the user interface associated with one or more devices depicted in FIG. 1.

At block 605, a security camera may monitor for predetermined events. The security camera may include an optical barrier. At block 610, upon detecting at least one of the predetermined events, the optical barrier may be repositioned to obstruct a transmission of light in relation to the cameras lens. With the camera lens obstructed the security camera is physically blocked from capturing images of an area within the security camera's configured field of view. In some cases, the optical barrier is configured to be visible within a predetermined distance from the security camera when the optical barrier is blocking the camera lens from view. Accordingly, with the optical barrier in the way of the camera lens and the optical barrier configured to be visible within a predetermined distance of the camera, an occupant of the premises where the security camera is located may be enabled to visually verify that the security camera is blocked from capturing images. At block 615, a first visual indicator may be activated upon repositioning the optical barrier to obstruct the cameras lens. In some cases, the first visual indicator may be located on the optical barrier.

Figure 7:
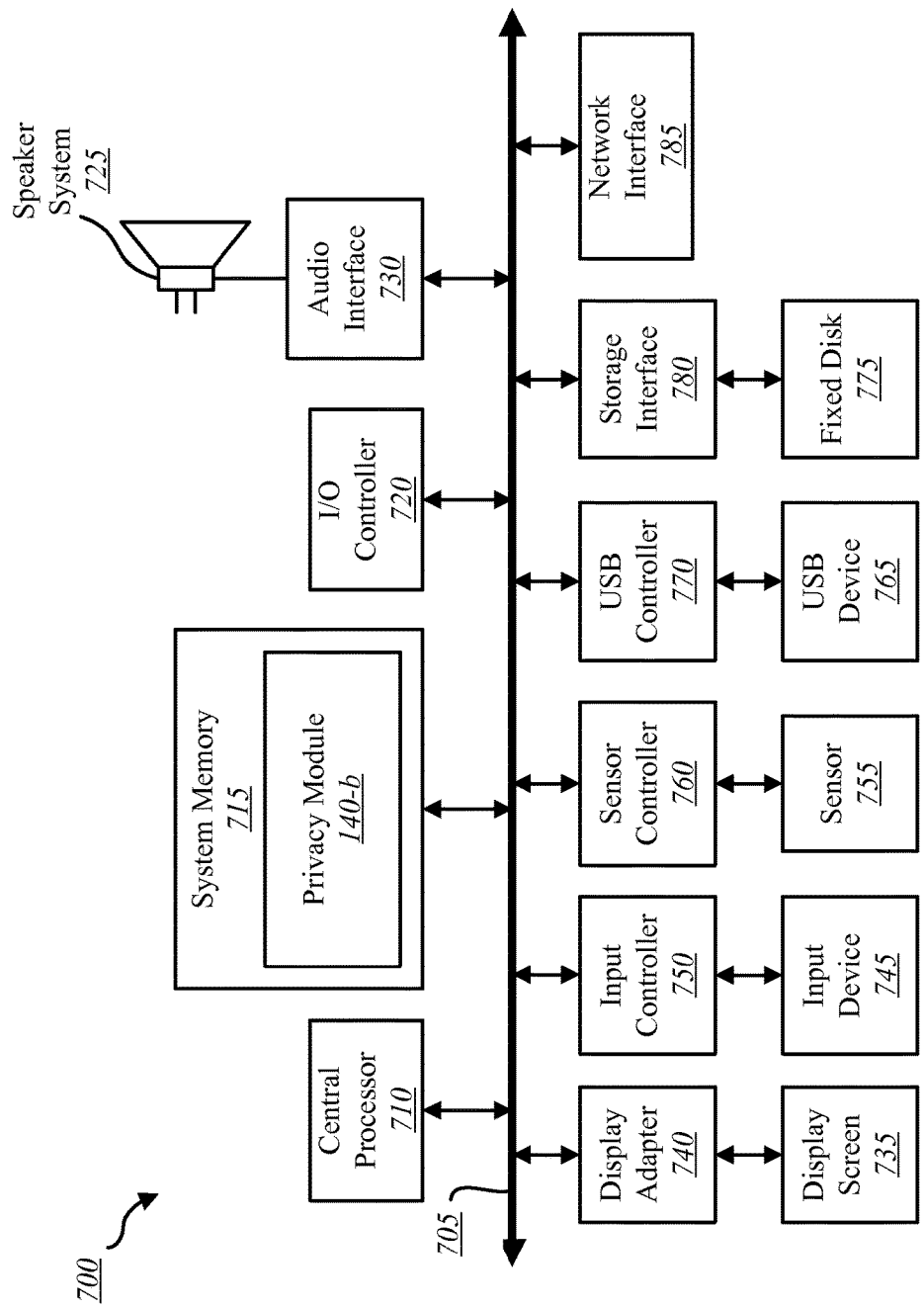
FIG. 7 depicts a block diagram of a computer system suitable for implementing the present systems and methods.

FIG. 7 depicts a block diagram of a controller 700 suitable for implementing the present systems and methods. The controller 700 may be an example of the set top box device 105, mobile computing device 130, and/or automation controller 135 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), one or more USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the privacy module 140-*b* to implement the present systems and methods may be stored within the system memory 715. Applications resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for improving privacy of security cameras, comprising:
   monitoring, via a security camera, an area to detect predetermined events, the security camera comprising an optical barrier, wherein at least one of the predetermined events indicate a change in status of a security system associated with the security camera;
   detecting, via the security camera, at least one of the predetermined events within the monitored area;
   based on detecting a change from a first status of the security system to a second status of the security system, repositioning, via the security camera, the optical barrier to cover a camera lens of the security camera, wherein repositioning the optical barrier comprises vertically pivoting the optical barrier from a first plane associated with the security camera to a second plane associated with the security camera;
   upon repositioning the optical barrier to cover the camera lens of the security camera, activating a first visual indicator to emit light in a first pattern, wherein the first pattern is associated with the second status of the security system and the camera lens of the security camera being covered;
   detecting a presence of a device associated with an occupant of the area, wherein the presence of the device is detected by the security camera while the camera lens of the security camera is covered by the optical barrier;

determining, via the security camera, an identity of the occupant based at least in part on the device associated with the occupant;

detecting a change in status of the security system associated with the security camera from the second status of the security system to the first status of the security system based at least in part on the determined identity of the occupant;

automatically repositioning, via the security camera, the optical barrier to uncover the camera lens of the security camera based at least in part on the detected change in the status; and upon repositioning the optical barrier to uncover the camera lens of the security camera, activating a second visual indicator to emit light in a second pattern, wherein the second pattern is associated with the first status of the security system and the camera lens of the security camera being uncovered.

2. The method of claim 1, further comprising:
upon detecting at least one of the predetermined events, repositioning the optical barrier to obstruct a field of view of the security camera.

3. The method of claim 2, wherein the optical barrier is configured to be visible within predetermined distance from the security camera when the optical barrier is obstructing the security camera's field of view.

4. The method of claim 2, wherein the first visual indicator is located on the optical barrier.

5. The method of claim 4, further comprising:
deactivating the first visual indicator upon repositioning the optical barrier to uncover the cameras lens.

6. The method of claim 2, further comprising:
generating a notification upon repositioning the optical barrier.

7. The method of claim 1, wherein detecting the predetermined events comprises:
receiving a remote request to activate the camera;
verifying an identity associated with the remote request; and
upon verifying the identity, implementing a notification and activating the camera.

8. The method of claim 1, wherein detecting the predetermined events comprises:
detecting a voice command from an occupant of a premises where the security camera is located.

9. The method of claim 1, wherein detecting the predetermined events comprises:
detecting initiation of communications between an occupant of a premises where the security camera is located and an administrator associated with the security camera.

10. A computing device configured for improving privacy of security cameras, comprising:
a security camera;
a processor;
memory in electronic communication with the processor;
instructions stored in the memory, the instructions being executable by the processor to:
monitor an area to detect predetermined events, the security camera comprising an optical barrier, wherein at least one of the predetermined events indicate a change in status of a security system associated with the security camera;
detect at least one of the predetermined events within the monitored area;
based on detecting a change from a first status of the security system to a second status of the security system, reposition the optical barrier to cover a camera lens of the security camera, wherein repositioning the optical barrier comprises vertically pivoting the optical barrier from a first plane associated with the security camera to a second plane associated with the security camera;
upon repositioning the optical barrier to cover the camera lens of the security camera, activate a first visual indicator to emit light in a first pattern, wherein the first pattern is associated with the second status of the security system and the camera lens of the security camera being covered;
detect a presence of a device associated with an occupant of the area, wherein the presence of the device is detected by the security camera while the camera lens of the security camera is covered by the optical barrier;
determine an identity of the occupant based at least in part on the device associated with the occupant;
detect a change in status of the security system associated with the security camera from the second status of the security system to the first status of the security system based at least in part on the determined identity of the occupant;
automatically reposition the optical barrier to uncover the camera lens of the security camera based at least in part on the detected change in the status; and
upon repositioning the optical barrier to uncover the camera lens of the security camera, activate a second visual indicator to emit light in a second pattern, wherein the second pattern is associated with the first status of the security system and the camera lens of the security camera being uncovered.

11. The computing device of claim 10, wherein the instructions are executable by the processor to:
upon detecting at least one of the predetermined events, repositioning the optical barrier to obstruct a field of view of the security camera.

12. The computing device of claim 11, wherein the optical barrier is configured to be visible within a predetermined distance from the security camera when the optical barrier is obstructing the security camera's field of view.

13. The computing device of claim 11, wherein the first visual indicator is located on the optical barrier.

14. The computing device of claim 13, wherein the instructions are executable by the processor to:
deactivate the first visual indicator upon repositioning the optical barrier to uncover the cameras lens.

15. The computing device of claim 11, wherein the instructions are executable by the processor to:
generate a notification upon repositioning the optical barrier.

16. The computing device of claim 10, wherein the instructions are executable by the processor to:
receive a remote request to activate the camera;
verify an identity associated with the remote request; and
upon verifying the identity, implement a notification and activate the camera.

17. A computer-program product for improving privacy of security cameras, the computer-program product comprising a non-transitory computer-readable medium storing instructions thereon, the instructions being executable by a processor to:

monitor, via a security camera, an area to detect predetermined events, the security camera comprising an optical barrier, wherein at least one of the predetermined events indicate a change in status of a security system associated with the security camera;

detect at least one of the predetermined events within the monitored area;

based on detecting a change from a first status of the security system to a second status of the security system, reposition the optical barrier to cover a camera lens of the security camera, wherein repositioning the optical barrier comprises vertically pivoting the optical barrier from a first plane associated with the security camera to a second plane associated with the security camera;

upon repositioning the optical barrier to cover the camera lens of the security camera, activate a first visual indicator to emit light in a first pattern, wherein the first pattern is associated with the second status of the security system and the camera lens of the security camera being covered;

detect a presence of a device associated with an occupant of the area, wherein the presence of the device is detected by the security camera while the camera lens of the security camera is covered by the optical barrier;

determine an identity of the occupant based at least in part on the device associated with the occupant;

detect a change in status of the security system associated with the security camera from the second status of the security system to the first status of the security system based at least in part on the determined identity of the occupant;

automatically reposition the optical barrier to uncover the camera lens of the security camera based at least in part on the detected change in the status; and upon repositioning the optical barrier to uncover the camera lens of the security camera, activate a second visual indicator to emit light in a second pattern, wherein the second pattern is associated with the first status of the security system and the camera lens of the security camera being uncovered.

18. The computer-program product of claim 17, wherein the instructions are executable by the processor to:

upon detecting at least one of the predetermined events, reposition the optical barrier to obstruct a field of view of the security camera.

* * * * *